United States Patent [19]

Hirose et al.

[11] 3,915,963

[45] Oct. 28, 1975

[54] 7-METHOXY-2,3'-DIHYDROBENZOFURAN DERIVATIVES, THEIR PHARMACEUTICALLY ACCEPTABLE ACID ADDITION SALTS AND METHOD FOR PREPARATION THEREOF

[75] Inventors: Noriyasu Hirose, Hogashi-Kurume; Shizuo Kuriyama, Saitama; Shigeru Souda, Tokyo, all of Japan

[73] Assignee: Eisai Co., Ltd., Tokyo, Japan

[22] Filed: Dec. 22, 1972

[21] Appl. No.: 317,843

[52] U.S. Cl........ 260/240 K; 424/285; 260/346.2 R
[51] Int. Cl.²........................................ C07D 307/81
[58] Field of Search................. 260/240 K, 346.2 R,

[56] References Cited
OTHER PUBLICATIONS

Ohgoh et al., Yakugaku Zasshi, Vol. 91, pp. 603–610, (1971).
Chemical Abstracts, Vol. 75, Abst. No. 88,406, (1971).
Conant, The Chemistry of Organic Compounds, p. 373, The Macmillan Co., NY, Revised Ed., 6th printing, 1943.
Lowy, An Introduction to Organic Chemistry, 6th Ed., pp. 263 and 269, John Wiley and Sons, NY, (1945).

*Primary Examiner*—John D. Randolph
*Attorney, Agent, or Firm*—Burgess, Dinklage & Sprung

[57] ABSTRACT

7-methoxy-2,3-dihydrobenzofuran derivatives and their pharmaceutically acceptable acid addition salts having outstanding analgesic activity with low toxicity, the compounds being prepared by reacting 2-halogenomethyl-7-methoxy-2,3-dihydrobenzofuran with an N-phenyl lower alkyl or alkenyl substituted amine and optionally converting the resulting reaction product into their pharmaceutically acceptable acid addition salts by a conventional procedure.

1 Claim, No Drawings

7-METHOXY-2,3-DIHYDROBENZOFURAN DERIVATIVES, THEIR PHARMACEUTICALLY ACCEPTABLE ACID ADDITION SALTS AND METHOD FOR PREPARATION THEREOF

This invention relates to the novel 7-methoxy-2,3-dihydrobenzofuane derivatives and their pharmaceutically acceptable acid addition salts having outstanding analgesic activity with low toxicity, and to the method for preparation thereof.

The novel 7-methoxy-2,3-dihydrobenzofuran derivatives which are the subject of the present invention are represented by the formula:

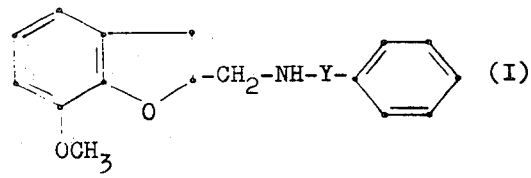

wherein Y is a saturated for unsaturated, lower, aliphatic divalent hydrocarbon radical such as methylene, ethylene, propylene, butylene, vinylene, propenylene and butenylene. As the pharmaceutically acceptable acid addition salts of the above compounds, there may be mentioned, for example, the inorganic acid addition salts such as hydrochloride, sulfate and nitrate as well as the organic acid addition salts such as acetate, citrate, methane sulfonate, fumarate, maleate and tartrate.

Superior analgesic activity exhibited by the 7-methoxy-2,3-dihydrobenzofuran derivatives and their acid addtion salts of the present invention will be apparent from the data of the following comparative animal experiments.

The experiments on mice were effected by employing 2-[N-(γ-phenylpropyl)-aminomethyl]-7-methoxy-2,3-dihydrobenzofuran malonate hereinafter called "compound A" of the formula:

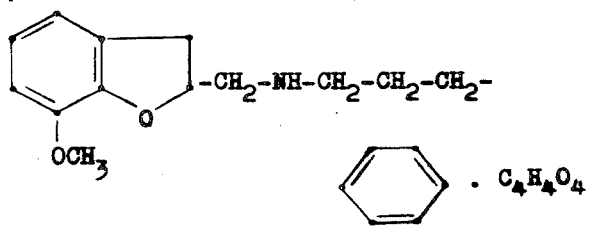

which is typical of said acid addition salts of 7-methoxy-2,3-dihydrobenzofuran derivatives of the present invention and Pentazocine of the formula:

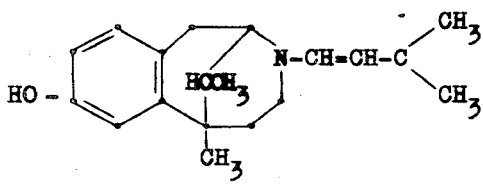

as a standard substance which has broadly been employed as an analgesic in clinical field.

A. Analgesic activity on mice a. Acetic acid stretching test 100 mg/kg and 50 mg/kg of the abovementioned two compounds were orally administered to the flocks of mice each consisting of 5 animals having the body-weight of 17–25 grams. When 15 minutes lapsed after the administrations, 0.1 ml/10 grams of a 0.5 percent aqueous acetic acid were intraperitoneally injected and the stretching behavior of the animal was observed for 10 minutes. The data obtained are tabulated below, wherein the signification "100%," for example, means a perfect control of the stretching.

Table I

| Compound | Oral administrations | |
|---|---|---|
| | 100 mg/kg | 50 mg/kg |
| Compound A: | 100% | 60% |
| Pentazocine: | 20% | 0% | b. Haffner method on mice 200 mg/kg and 100 mg/kg of each of the compound A and Pentazocine were orally administered to the flocks of mice each consisting of 5 animals of 17–25 gram body-weight.

After 10 minutes, each tail of the animals under test was cramped at its root with an artery cramp and the grasping power or extent of the oppression was suitably adjusted to cause stimulation. Behavior of the animal was then observed whether the animal did look back at its cramped tail or not. When all of the animals of the flock did not look back, it was judged that the analgesic activity shown by a given dosage is perfect.

The results of the observation are tabulated below, wherein the percentages (%) show immediately the measures of effectiveness caused by the above dosages of the two compounds, on the basis of the perfect analgesic activity.

Table II

| Compound | Oral administrations | |
|---|---|---|
| | 200 mg/kg | 100 mg/kg |
| Compound A: | 40% | 35% |
| Pentazocine: | 0% | 0% |

B. Acute toxicity

Each 200 mg of the compound A and Pentazocine were intraperitoneally injected to the mice having 17–25 gram body-weight. After 24 hours, mortality of the animals were inspected. The results are tabulated.

Table III

| Compound | Mortality |
|---|---|
| Compound A: | 60% |
| Pentazocine: | 100% |

In consideration of the data of the above comparative experiments on the mice, it is apparent that the compound A of the present invention possesses a strong analgesic activity with a relatively low toxicity and is therefore useful as analgesic.

7-Methoxy-2,3-dihydrobenzofuran derivatives of the aforementioned formula (I) may be prepared by reacting 2-halogenomethyl-7-methoxy-2,3-dihydrobenzofuran with an N-phenyl lower alkyl or alkenyl substituted amine in accordance with the following schematic equation:

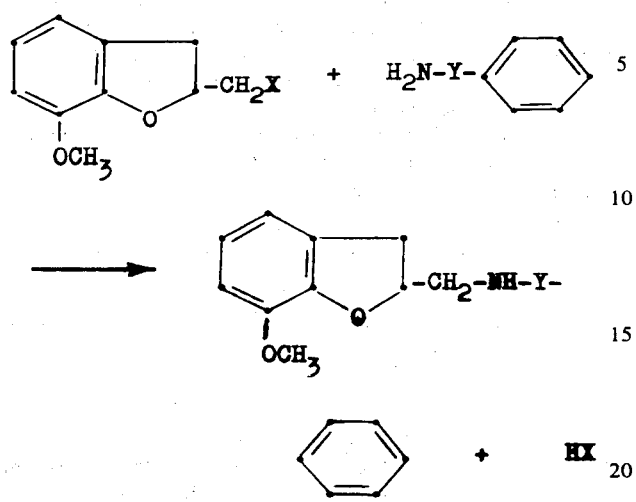

wherein X is halogen atom and Y has the same meanings as in the above formula (I). The reaction can advantageously be effected by keeping the ratio of equimolar proportion between the reactants in the absence or presence of an inert solvent such as methanol, ethanol, propanol, i-propanol, benzene, toluene, xylene and the like. The reaction can smoothly be conducted with the aid of a conventional acid-binding agent such as a tertiary amine exemplified by triethylamine, a caustic alkali and an alkali bicarbonate. In general, the purposed free bases are obtained in an oily substance which may be converted into their crystalline acid addition salts by a conventional procedure.

Following Examples will serve to illustrate the preparation of the compounds of the formula (I) and their acid addition salts.

Example 1

Preparation of
2-(N-cinnamyl)aminomethyl-7-methoxy-2,3-dihydrobenzofuran 3.5 Grams of 2-bromomethyl-7-methoxy-2,3-dihydrobenzofuran, 3.1 grams of cinnamylamine and 2.4 grams of sodium bicarbonate were introduced into 100 ml of isopropanol in a reaction vessel provided with a reflux condenser. The resulting mixture in the vessel was heated under reflux for 15 hours. After completion of the reaction, the reaction mixture was filtered and the filtrate was concentrated by evaporation. The residue obtained was subjected to distillation under reduced pressure. An oily substance of the desired compound was recovered as a fraction boiling at 198°–202°C./0.4 mmHg. Yield was 3.9 grams.

The product was converted in accordance with a usual manner into its maleate which was then recrystallized from isopropanol. The crystalline substance having a melting point of 165°–165.5°C. and a presumed formula $C_{19}H_{21}NO_2.C_4H_4O_4$ gave the following analysis:

|  | C | H | N |
|---|---|---|---|
| Calculated (%): | 67.14 | 6.12 | 3.40 |
| Found (%): | 67.47 | 6.05 | 3.32 |

Example 2

Preparation of
2-[N-(γ-phenylpropyl)aminomethyl]-7-methoxy-2,3-dihydrobenzofuran 18 Grams of 2-bromomethyl-7-methoxy-2,3-dihydrobenzofuran, 10 grams of γ-phenylpropyl amine and 12 grams of potassium bicarbonate were introduced into 100 ml of isopropanol in a reaction vessel provided with a reflux condenser.

The resulting mixture was heated under reflux for 30 hours. After completion of the reaction, the reaction mixture was filtered and the filtrate was concentrated by evaporation. The residue was concentrated hydrochloric acid. A solid substance precipitated out was recovered by filtration and dried in dry air. The dried substance after washing with ethyl ether was recrystallized from isopropanol. 20 Grams of the desired compound were recovered as the hydrochloride having a melting point of 158°–160°C.

Elementary analysis of the hydrochloride having a presumed formula $C_{19}H_{23}NO_2.HCl$ gave:

|  | C | H | N |
|---|---|---|---|
| Calculated (%): | 68.34 | 7.25 | 4.19 |
| Found (%): | 68.16 | 7.22 | 4.46 |

Example 3

Preparation of
2-(N-benzyl)aminomethyl-7-methoxy-2,3-dihydrobenzofuran 3.5 Grams of 2bromomethyl-7-methoxy-2,3-dihydrobenzofuran, were reacted with 3.5 grams of benzylamine in accordance with the procedure disclosed in Example 1.

A free base having a boiling point of 175°–180°C./0.4 mmHg was thus obtained. The maleate of the base had a melting point of 169°–169.5°C. Elementary analysis of the maleate having a presumed formula $C_{17}H_{19}NO_2.C_4H_4O_4$ gave:

|  | C | H | N |
|---|---|---|---|
| Calculated (%): | 65.43 | 6.03 | 3.64 |
| Found (%): | 65.14 | 6.06 | 3.66 |

Example 4

Preparation of
2-[N-(β-phenylethyl)aminomethyl]-7-methoxy-2,3-dihydrobenzofuran

2-Bromomethyl-7-methoxy-2,3-dihydrobenzofuran was subjected to reaction with β-phenylethylamine in accordance with the procedure disclosed in Example 1.

There was obtained the maleate of the desired compound having a melting point of 180°–181°C. and a presumed formula $C_{16}H_{21}NO_2.C_4H_4O_4$ which gave the following analytical data:

|  | C | H | N |
|---|---|---|---|
| Calculated (%): | 66.14 | 6.32 | 3.51 |
| Found (%): | 66.06 | 6.22 | 3.52 |

Example 5

Preparation of 2-[N-(α-phenylethylamino)methyl]-7-methoxy-2,3-dihydrobenzofuran 2-Bromomethyl-7-methoxy-2,3-dihydrobenzofuran was subjected to reaction with α-methylbenzyl amine in accordance with the procedure disclosed in Example 1.

There was obtained the desired compound in a form of maleate having a melting point of 152.5°–154°C. and a presumed formula $C_{16}H_{21}NO_2 \cdot C_4H_4O_4$ which gave the following analytical data:

|  | C | H | N |
|---|---|---|---|
| Calculated (%): | 66.14 | 6.32 | 3.51 |
| Found (%): | 65.72 | 6.37 | 3.50 |

What is claimed is:
1. 2-(cinnamyl)aminomethyl-7-methoxy-2,3-dihydrobenzofuran and its pharmaceutically acceptable acid addition salts.

* * * * *